United States Patent [19]

Kataoka et al.

[11] Patent Number: 5,719,832
[45] Date of Patent: Feb. 17, 1998

[54] OPTICAL RECORDING APPARATUS USING OPTICAL FIBERS FOR GUIDING LASER BEAMS

[75] Inventors: Keiji Kataoka; Masazumi Ouchi; Yasuyuki Shibayama, all of Ibaraki, Japan

[73] Assignee: Hitachi Koki Co., Ltd., Tokyo, Japan

[21] Appl. No.: 740,958

[22] Filed: Nov. 5, 1996

[30] Foreign Application Priority Data

Nov. 17, 1995 [JP] Japan ................................ 7-299698

[51] Int. Cl.⁶ .............................................. G11B 13/00
[52] U.S. Cl. .................................. 369/14; 369/112
[58] Field of Search ............................ 369/14, 13, 15, 369/102, 109, 112, 121

[56] References Cited

U.S. PATENT DOCUMENTS 4,771,415 9/1988 Taki ........................................ 369/112
5,152,597 10/1992 Barnard ................................... 359/130
5,218,582 6/1993 Marchant ................................ 369/14
5,343,460 8/1994 Miyazaki et al. ...................... 369/13
5,619,488 4/1997 Ota et al. ............................... 369/112

*Primary Examiner*—Tan Dinh
*Attorney, Agent, or Firm*—Sughrue, Mion, Zinn, Macpeak & Seas, PLLC

[57] ABSTRACT

In an optical recording apparatus for performing optical recording by guiding a plurality of beams of light from semiconductor lasers into single-mode optical fibers and sweeping the beams of light injected from the optical fibers with a rotary polygonal mirror, a transparent member is closely attached to an end of the optical fibers on a light injecting side.

7 Claims, 2 Drawing Sheets

OPTICAL RECORDING APPARATUS USING OPTICAL FIBERS FOR GUIDING LASER BEAMS

BACKGROUND OF THE INVENTION

1. Field of the Invention

The invention relates to an optical recording apparatus that performs optical recording using a plurality of laser beams.

2. Description of the Related Art

When optical recording is performed by sweeping a plurality of laser beams simultaneously with a rotary polygon mirror in an optical recording apparatus such as a laser printer, high-speed recording can be implemented with an increase in speed proportional to a number of beams even if the rotational speed of the rotary polygon mirror cannot be increased. Optical fibers are available as a means for generating a plurality of laser beams. In this method, a plurality of beams of light from semiconductor lasers are guided into corresponding single-mode optical fibers, and these single-mode optical fibers are arranged in a row, so that a plurality of beams of light injected from the array of optical fibers are utilized in optical recording.

When using beams of light from semiconductor lasers whose wavelength is, e.g., 0.64 µm, the diameter of a portion called "the core portion" through Which beams of light of single-mode optical fibers are propagated is about 4 µm, and a plurality of beams of light emitted from an array of optical fibers are emitted with a diameter close to the diameter of the core portion from an end of the optical fibers. If dirt or dust suspended in the air adheres to the core portion on the end of the optical fibers, the dirt or dust covers a relatively large part of the core portion since the core portion of the single-mode optical fiber is small. As a result, intensity of light for part of the plurality of beams emitted from the array of optical fibers is reduced, resulting in the shortcoming that optical recording is not performed satisfactorily.

SUMMARY OF THE INVENTION

The invention has been made in view of the above circumstance, and therefore an object of the invention is to provide an optical recording apparatus that utilizes a highly reliable array of optical fibers so that even if dirt and dust suspended in the air adhere to the array of optical fibers, effects of the dirt and dust can be controlled.

In order to solve the above problem, according to the invention, there is provided an optical recording apparatus for performing optical recording by guiding a plurality of beams of light from semiconductor lasers into single-mode optical fibers and sweeping the beams of light emitted from the optical fibers with a rotary polygonal mirror, wherein a transparent member is attached to an end of the optical fibers on a light emitting side.

With the above structure, according to the invention, the effects of dirt and dust suspended in the air can be significantly reduced, which in turn contributes to providing an optical recording apparatus that utilizes a highly reliable array of optical fibers.

The above and other objects and features of the present invention will be more apparent from the following description taken in conjunction with the accompanying drawings.

DETAILED DESCRIPTION OF THE PREFERRED EMBODIMENTS

Now, a description will be given in more detail of embodiments of the invention with reference to the accompanying drawings.

Figure 4:
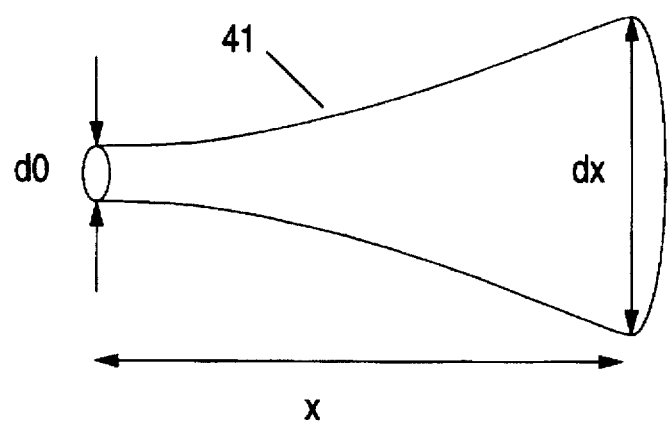
FIG. 4 is a diagram illustrative of beams of light emitted from the optical fibers.

A laser beam emitted from the core of an optical fiber has its diameter increased by diffraction of light. This condition will be described with reference to FIG. 4. Assuming that the diameter of a beam of light emitted from the core portion of a single-mode optical fiber is $d_0$, the diameter $dx$ of the beam at a place that is away from an end of the optical fiber a distance of x is expressed as follows.

$$dx = d_0 \sqrt{1+(x^2/x_0^2)} \tag{1}$$

where $x_0 = \pi \cdot d_0^2 \cdot n/4\lambda$; $\lambda$ is the wavelength of a beam; n is the reflectance of a region through which the beam emitted from the core is propagated; and de is the diameter of the beam emitted from the core portion of the optical fiber. Let it be assumed that the wavelength $\lambda$ of the beam is 0.64 µm; the diameter $d_0$ of the beam emitted from the single-mode optical fiber is 4 µm since such diameter is almost equal to the diameter of the core of the optical fiber; the reflectance of a glass plate closely attached to an end of the optical fiber is 1.5; and the thickness of the glass plate is 1 mm. Then, from the above equation, it is calculated that $x_0 = 29.45$ µm and that the diameter $dx$ of the beams being propagated through the glass plate whose thickness is 1 mm is 136 µm. Therefore, if the glass plate having such thickness is Closely attached to the array of optical fibers, the diameter of the optical beams emitted from the glass plate is increased significantly to 136 µm, in this embodiment, compared with 4 µm that is the diameter of the optical beam with no glass plate attached. As a result, effects of dirt or dust suspended in the air can be reduced remarkably. Further, from the above equation, the diameter of a beam at a distance x where $x < x_0$ is increased to a value only 1.4 times $d_0$ at maximum, which means that the conventional shortcoming cannot be corrected. Hence, the thickness g of the glass plate to be closely attached to the array of optical fibers must be $g > x_0$.

Figure 1:
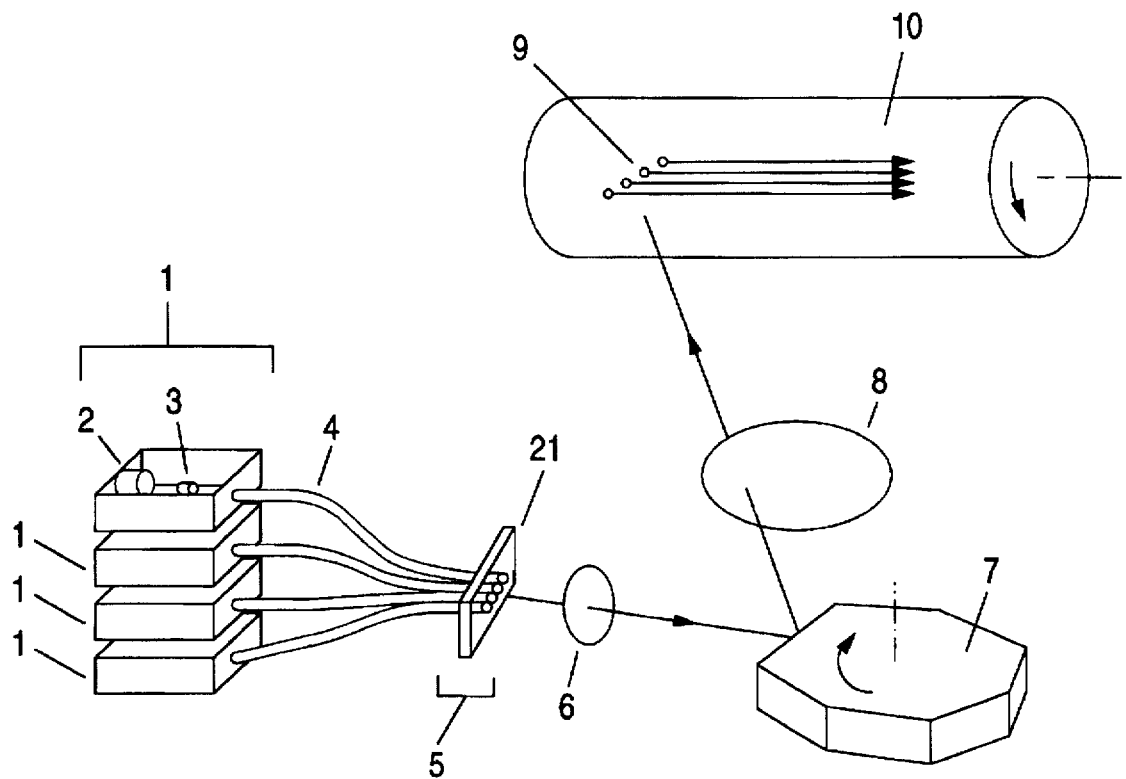
FIG. 1 is a schematic diagram showing a construction of an optical recording apparatus of the invention.

An embodiment of the invention will be described with reference to the drawings. FIG. 1 shows an optical recording apparatus of the invention. Reference numeral 1 denotes a laser module section. A beam of light emitted from a semiconductor laser 2 is guided into a single-mode optical fiber 4 through a lens 3. A plurality of laser modules are prepared, so that an array 5 of optical fibers can be constructed. A glass plate 21 is closely attached to the array 5 of optical fibers. A plurality of laser beams emitted from the array 5 of optical fibers and the glass plate 21 are guided into a rotary polygon mirror 7 through a lens 6. The rotary polygon mirror is rotated as indicated by the arrow so as to cause the plurality of laser beams to optically sweep a photoreceptor at once. A lens 8 serves to form small optical spots on the photoreceptor 10. While the plurality of beams from the array 5 of optical fibers sweep the photoreceptor 10 as an array of optical spots 9, the sweeping pitch is corrected by adjusting the angle of inclination of the array of optical spots with respect to the sweeping direction.

Figure 2:
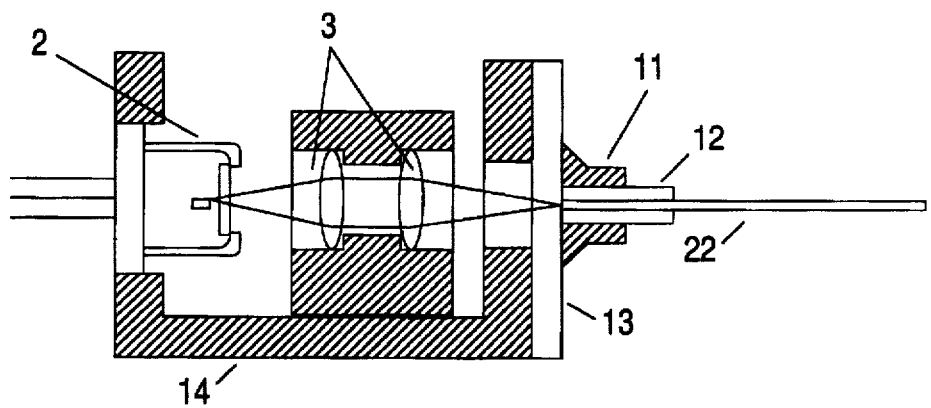
FIG. 2 is a diagram showing a construction of a laser module to be applied to the invention.

Details of the laser module section are shown in FIG. 2. The semiconductor laser 2 is welded to an invar table 14 by a laser welding means. The surface of a fused quartz 13 on the optical fiber side is bonded to the invar table 14. The surface of the fused quartz on the semiconductor laser side is given a nonreflecting coating. The beam of light emitted from the semiconductor laser forms an image on an end of the single-mode optical fiber 22 through the lens 3. The single-mode optical fiber is bonded by removing the sheath covering the optical fiber, exposing the cladding whose diameter is 125 μm, and being inserted into a ferrule 12. The ferrule is bonded to a ferrule holder 11. The single-mode optical fiber integrated with the ferrule and the ferrule holder is bonded to the fused quartz 13 by an ultraviolet curing resin. The reason why the fused quartz is used is that the fused quartz transmits well ultraviolet rays that cure the ultraviolet curing resin.

Figure 3:
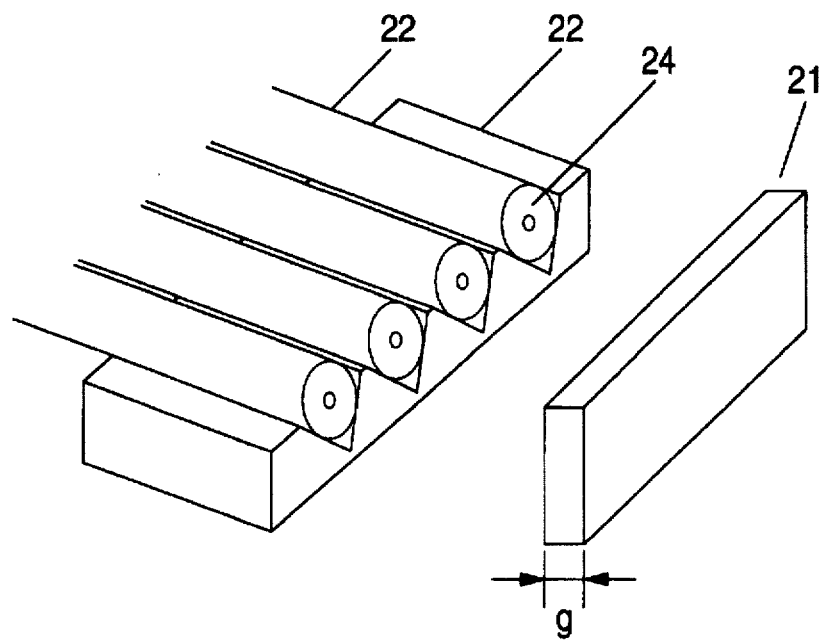
FIG. 3 is a diagram illustrative of a construction of an array of optical fibers of the invention.

Details of the array 5 of optical fibers shown in FIG. 1 will be described with reference to FIG. 3. The single-mode optical fibers 22 with the sheaths thereof removed and the claddings thereof exposed are bonded to a member 23 that has V-shaped grooves formed therein. The V-shaped grooves can be formed by anisotropic etching using a silicon crystal as a material. The diameter of the cladding is 125 μm. A laser beam is propagated through a core portion 24 of each optical fiber. The diameter of the core is 4 μm. After grinding the end faces of the respective optical fibers, a glass plate 21 is bonded to the array of optical fibers. The thickness of the glass plate 21 may be about 1 mm as described before. If effects of dirt and dust are to be further eliminated, the thickness of the glass plate 21 may be further increased. In order to improve utilization of light, a nonreflecting coating may be applied to a surface opposite to the surface of the glass plate 21 on the optical fiber side. However, it is not necessary to apply such a coating to the surface of the glass plate 21 on the optical fiber side, because the refractive indices of the optical fiber, the adhesive, and the glass plate 21 are almost equal to one another, and this means that there is little reflection of light at the interfaces of these members, and these members therefore transmit beams of light at high transmittances. This method is thus advantageous in dispensing with the cumbersome process of applying a nonreflecting coating to the end face of each optical fiber itself. Further, even if dirt and dust adhere to the end faces of the optical fibers, it is far easier to clean the surface of the glass plate 21 with an organic solvent or the like than to treat the end faces of the optical fibers.

According to the invention, a transparent member is closely to the end faces of optical fibers on the light emitting side. Therefore, effects of dirt and dust suspended in the air can be significantly reduced, which in turn contributes to providing an optical recording apparatus having a highly reliable array of optical fibers.

Laser beams from optical fibers emit in various polarization directions. This causes intensity imbalance on the photoreceptor because the optics have different transmittances at different polarizations. If this is a serious problem, a quarter waveplate can be used effectively as the transparent member closely attached to the end faces of the optical fibers on the light emission side. The waveplate transforms the beam from an optical fiber into a beam of equal intensity in both p and s directions, where the p is parallel direction to the scanning plane and the s is perpendicular direction to the scanning plane. Alternatively, the transparent member can be made of an organic, high-molecular-weight material.

These above-mentioned embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An optical recording apparatus, comprising:

a plurality of semiconductor lasers for emitting a plurality of laser beams;

a plurality of single-mode optical fibers provided correspondingly to said semiconductor lasers, for guiding the laser beams from said semiconductor lasers, each of said optical fibers having a light emitting end from which a corresponding one of said laser beams is emitted;

means for scanning the laser beams emitted from said single-mode optical fibers on a recording medium; and a transparent member closely attached to said light emitting end of each of said single-mode optical fibers.

2. An optical recording apparatus according to claim 1, wherein a thickness g of the transparent member satisfies the following condition:

$$g > \pi \cdot d_0^2 \cdot n/4\lambda$$

where $d_0$ is the diameter of a laser beam emitted from a core portion of each optical fiber; n is the refractive index of a region through which the laser beam emitted from each optical fiber is propagated; and $\lambda$ is the wavelength of said single-mode optical fiber.

3. An optical recording apparatus according to claim 1, wherein said transparent member is made of glass.

4. An optical recording apparatus according to claim 1, wherein said transparent member is made of an organic high-molecular-weight material.

5. An optical recording apparatus according to claim 1, wherein said transparent member is a quarter waveplate.

6. An optical recording apparatus, comprising:

a plurality of semiconductor lasers for emitting a plurality of laser beams;

a plurality of single-mode optical fibers provided correspondingly to said semiconductor lasers, for guiding the laser beams from said semiconductor lasers;

means for scanning the laser beams emitted from said single-mode optical fibers on a recording medium; and a transparent member closely attached to an end of said single-mode optical fibers on a light emitting side, wherein a thickness g of the transparent member satisfies the following condition:

$$g > \pi \cdot d_0^2 \cdot n/4\lambda$$

where $d_0$ is the diameter of a laser beam emitted from a core portion of each optical fiber; n is the refractive index of a region through which the laser beam emitted from each optical fiber is propagated; and $\lambda$ is the wavelength of said single-mode optical fiber.

7. An optical recording apparatus, comprising:

a plurality of semiconductor lasers for emitting a plurality of laser beams;

a plurality of single-mode optical fibers provided correspondingly to said semiconductor lasers, for guiding the laser beams from said semiconductor lasers, each of said optical fibers having a light emitting end from which a corresponding one of said laser beams is emitted;

a rotary polygonal mirror and a lens, for scanning the laser beams emitted from said single-mode optical fibers on a recording medium; and a transparent member attached to said light emitting end of each of said single-mode optical fibers.

* * * * *